United States Patent [19]

Sindermann

[11] 4,007,362
[45] Feb. 8, 1977

[54] METHOD OF INFORMATION PROCESSING FOR THE PRODUCTION OF A PRINTING FORM AND A SYSTEM FOR PERFORMING SAID METHOD

[75] Inventor: Wolfgang Sindermann, Willinghusen, Germany

[73] Assignee: Gruner & Jajr AG & Co., Germany

[22] Filed: June 23, 1975

[21] Appl. No.: 589,782

[30] Foreign Application Priority Data

June 26, 1974 Germany .................. 2430762

[52] U.S. Cl. .................... 235/151; 178/DIG. 27; 358/280; 358/264
[51] Int. Cl.² ................ H04N 1/06; G06F 3/14
[58] Field of Search ................ 235/151, 151.22; 178/69.5 F, 7.6, 7.7, DIG. 27, 6.6 A, 6.6 B; 445/1

[56] References Cited
UNITED STATES PATENTS

| | | | |
|---|---|---|---|
| 3,223,778 | 12/1965 | Stone et al. | 178/69.5 F X |
| 3,497,610 | 2/1970 | Langberg et al. | 178/69.5 F X |
| 3,581,000 | 5/1971 | Hansen et al. | 178/7.6 |
| 3,582,549 | 6/1971 | Hell et al. | 178/69.5 F |
| 3,657,472 | 4/1972 | Taudt et al. | 178/6.6 B X |
| 3,729,584 | 4/1973 | De Vos et al. | 178/6.6 B |
| 3,843,839 | 10/1974 | Campbell et al. | 178/69.5 F X |
| 3,849,592 | 11/1974 | Rosenheck | 178/DIG. 27 X |
| 3,878,559 | 4/1975 | Pugsley | 178/6.6 B X |

Primary Examiner—Edward J. Wise
Attorney, Agent, or Firm—Beaman & Beaman

[57] ABSTRACT

A method of information processing in which the sequence of points to be scanned on an original is selected, which sequence is freely selectable in both the coordinate directions. The original is scanned by scanning means producing electrical image signals. The image signals are digitalized. The information of the original is stored in the form of the image signals in the storage location of a memory. For a selected variation of at least part of the stored information the stored information is displayed. The addresses of the storage locations, which are intended to be varied in their information contents, are determined by detecting the coordinates of the part-information to be varied.

The contents of the address storage locations is processed in a computer, which is supplied with control commands necessary for the intended variation of the information contents. The processed information is edited in a form suitable for the control of the production of the printing form.

30 Claims, 5 Drawing Figures

METHOD OF INFORMATION PROCESSING FOR THE PRODUCTION OF A PRINTING FORM AND A SYSTEM FOR PERFORMING SAID METHOD

BACKGROUND OF THE INVENTION

The invention refers to a method of information processing for the production of a printing form for printing the image of an original, especially the production of an intaglio printing form, wherein image signals corresponding to the information contents of the original and aquired by scanning the original and digitalized thereafter are stored in a memory and processed in a computer and wherein the information is thereafter edited in a form suitable for the production of the printing form.

A method of information processing is known from the German Patent Letter No. 1 193 534, which serves the recording of the digitalized image signals with a continuously adjustable recording scale on a recording medium. The original and the recording medium for the recording of the stored image signals are mounted on drums of like diameter and like rotational speed. The stored image signals are called with freely selectable rate, while the called image signals control the recording elements and while the feed rate of the scanning elements are adjusted with respect to the original corresponding to the recording scale determined by the ratio of the calling rate and the storing rate, respectively, and corresponding to the line density selected for the recording. If the information processing is to serve the production of colour separations, the known process provides that the image signals of the individual colour separations are submitted to a colour correction in a computer either before their storing in said memory or after the destoring from said memory. In the first case, the memory already stores the corrected colour separation image signals, whereas in the latter case the uncorrected colour separation image signals are stored.

The known method does not yet provide to perform the entire information processing starting from the original and leading to the printing form ready for print in pure electronic manner independently on the printing process. Up to now, usually colour separations in form of black-and-white films in the desired final format of the printing form have been produced from coloured originals by means of a camera or by means of a drum scanner. Different information variations had to be performed on these films by means of the reproduction technology, i.e. retouchings and mountings had to be performed manually. For example, it was necessary to perform retouchings on negative or positive films in dependency on the type of detail to be retouched. The retouched colour separations were the basis for coloured control copies, which allow a judgement over the printing result to be achieved during the printing process. It proved, however, that often further retouching corrections are necessary. The finished and checked colour separations have then to be optically printed on special film material, before they can be scanned for example by the scanning unit of an engraving machine for the production of an intaglio printing form.

The previously only in coarse manner discussed operational steps, which are necessary in to-day reproduction, are extremely intensive with respect to labour and costs; the main disadvantage thereof, however, resides in the fact that after the provision of the originals for a page to be printed usually a considerable time interval passes away, before the printing form is ready.

SUMMARY OF THE INVENTION

An object of this invention is to provide a method of information processing, with which the entire information processing starting from the original and ending with the finished printing form can be performed in a purely electronic manner independently on the printing process.

This object is achieved by a method of information processing for the production of a printing form for printing the image of an original, which comprises the steps of selecting the sequence of the points to be scanned on the original, which sequence is freely selectable in both the coordinate directions of the original, scanning the original by scanning means producing electrical image signals and digitalizing said image signals, storing the information of the original in form of said image signals in the storage locations of a memory, displaying the stored information for a selected variation of at least part of the information, determining the addresses of the storage locations, which are intended to be varied in their information contents, by detecting the coordinates of the part-information to be varied, processing the contents of the addressed storage locations in a computer, which is supplied with control commands necessary for the intended variation of the information contents and of editing the processed information in a form suitable for the control of the production of the printing form.

The free selectibility of the scanning point order or sequence in both the coordinate directions of the original means provides, among other things, that the resolution of the original may be selected to be different in both the coordinate directions, so that the resolution may be adapted to the resolution and the printing point position of the later printing operation at will. Therefrom the further advantage results that with any edition which — as it is the case with the intaglio printing — makes a special raster angle necessary, no complicate coordinate transformations have to be performed during the entire treatment process.

The scanning of the original points is preferably performed in any given order or sequence.

On the other hand, it is sometimes suitable that the scanning of the original points is performed linearly and the point spacing within one line and/or the line spacing are selected independently on each other.

After the original or all part-originals belonging to a motive of print have been scanned in the previously described manner and the information thereof has been stored in the memory, the information contents of the original can be treated by data processing in any manner, since the information contents of the original is at hand in form of electronic memory data. Thus, for example, for a retouching the information contents of the storage locations corresponding to the image portions to be retouched may be varied by evaluation thereof with multiplicative or additive values and by corresponding recomputation in the computer. For mounting purposes the image portions to be shifted are re-grouped in the memory with respect to their addresses.

It is further of advantage, if besides the information gained by scanning an original electronically composed information is also stored, which information is gained by means of an electronic composition processing machine. This electronic composition processing machine can transfer the text to be stored in the form of individual letters, words, justified lines, blocks or complete pages. It should be understood that the reglets and special marks (e.g. corporation symbols or the like) which are usually used in composing, may also be transferred from the electronic composition processing machine.

It should be further noted that the information contents of the originals to be scanned may be anyone, i.e. the originals may be half-tone or pencil-line figurative representations as well as lettering.

Further, a very important feature of the present invention resides in the fact that the redundancy of the information to be stored is reduced before the storing of the image signals. The redundancy of the information is reduced with respect to the organization (Byte-word structure etc) of the data processing machine comprising the memory and the computer as well as with respect to the information contents of the individual data (different points with like or very similar information).

During the display of the stored image information preferably the contours of the addressed image portions are also displayed to enhance the delimitation of those image portions. To be able to still reconstruct all the performed treatment operations in case of later-on inquiries, the contours of all the image portions which have been treated are recorded on a recording medium. The type of the variation of the information contents of the storage locations corresponding to the individual image portions can be recorded by using different symbols.

For a precontrol before the first print of the printing form to be produced later on, the entire information contents may be edited on a recording medium while using a hard-copy process. Images as well as texts may be edited before, during or after the treatment operation in black-and-white as well as in colour.

For the output it is provided that the data of all pages corresponding to a printing form are at first stored and treated and that thereafter a resorting of the data is performed within the memory in such a manner that after the resorting the positions of the data within the memory correspond to the positions of the pages on the printing form. The free access to the information of the individual point and the previously mentioned free selectibility of the position of the individual image point provide for a substantial reduction of the computation expanditure. Since the information contents of a printing form is not distributed on a plurality of individual films as it was the case up to now, but is electronically stored starting from the scanning of the original the organization expanditure, which is usually necessary to-day, can be performed exclusively with data processing and thus in a fully automatic manner.

With the production of an intaglio printing form the processed and re-sorted stored data can be used to control an engraving machine directly.

A further object of this invention is to provide a system for information processing for the production of a printing form for the printing of an original, which comprises an input unit including at least a scanner for scanning an original with a driven scanning head producing electrical image signals, control means for the drive means of said scanning head, which control means allows the free selection of the scanning point sequence of the scanning head, information forming means for digitalizing said image signals; a data processing machine connected to said input unit and including memory means and a central processing unit; a treatment unit connected to said memory means and said central processing unit, which treatment unit in turn includes at least an assembly for displaying the stored information, as assembly for detecting the coordinates of portions of the displayed information and an assembly for the manual input of data processing commands; and an output unit connected to said data processing machine and including a printing form production machine.

Further, the system preferably includes an assembly for a hard-copy recording and/or a plotter assembly for producing a graphic record of the entire retouching and mounting operations.

Since the information contents of the original is already reduced during the scanning to the information contents which can be reproduced in print, the amount of storage locations necessary for the data processing is delimited to a minimum.

Each of the above units is provided with an interface for the transfer of signals towards the data processing machine and from the data processing machine.

There is the possibility that the interfaces cooperate with the data processing machine in ON-LINE or in OFF-LINE operation or that the interfaces directly cooperate with the peripheral devices of a data processing machine, while by-passing the central processing unit of a data processing machine.

DETAILED DESCRIPTION OF THE INVENTION

Figure 1:
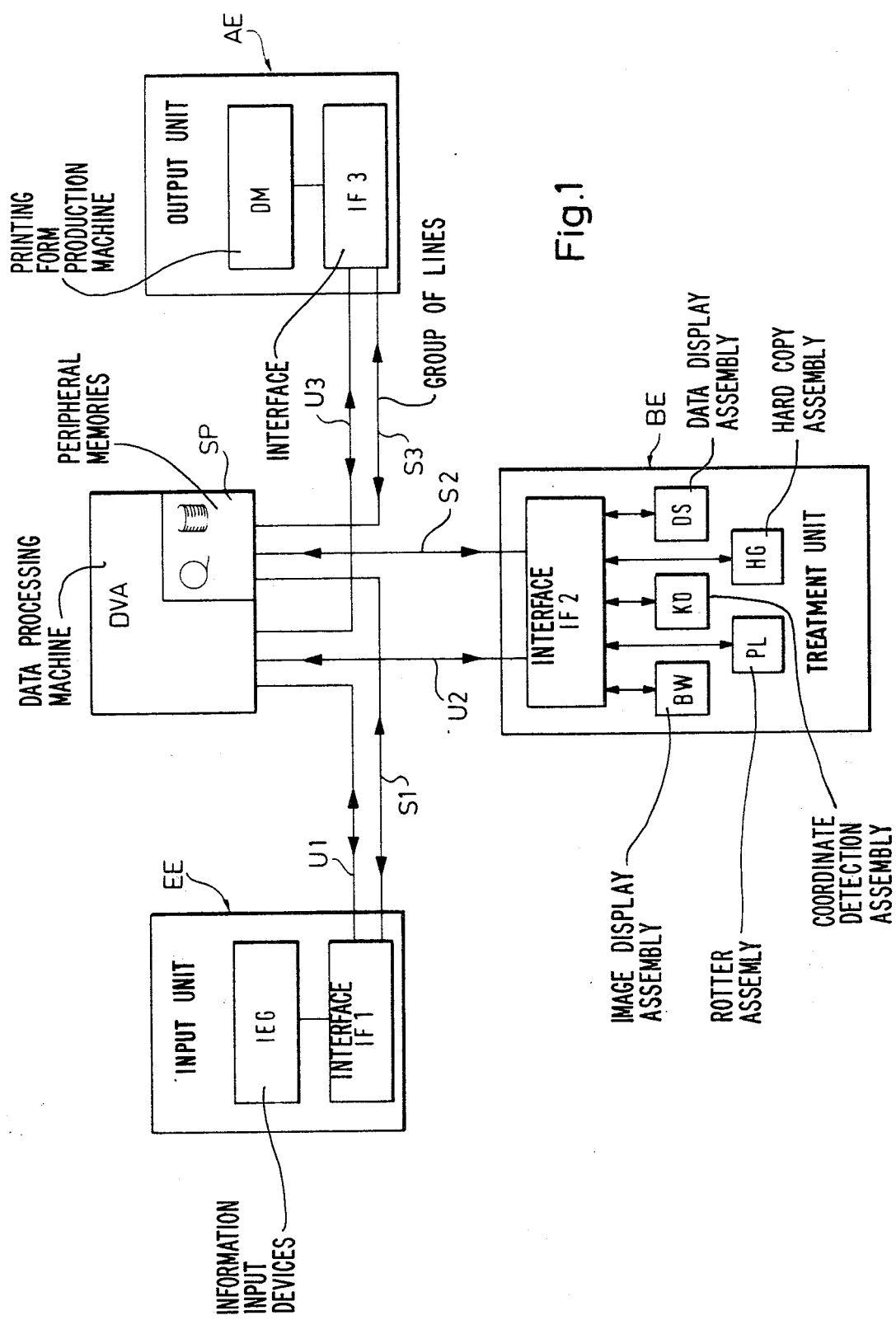
FIG. 1 is a diagrammatic illustration of one embodiment of a system, which may be used to carry out the present method.

At first, the principal diagram according to FIG. 1 shall be described. The device includes an input unit EE, the important components of which are information input devices IEG and an interface IF 1. The interface IF 1 provides the data transfer from the information input devices to a data processing machine DVA via a group of lines U1. The interface IF 1 also controls a composition (matter) processing machine and a scanner belonging to the information input devices in such a manner that the resolution of the original to be scanned may be selected to be differently in both the coordinate directions. This will be described in greater detail later on. Further, the interface IF 1 is connected to the peripheral equipment of the data processing machine DVA via a group of lines S 1; the reasons for this connection are described later on.

The data processing machine DVA includes peripheral memories SP, which are shown in FIG. 1 by the symbols for a tape and a disc storage, respectively.

The data processing machine DVA is connected to a treatment unit BE via groups of lines S2 and U2, respectively. The treatment unit BE includes an interface IF 2, an image display assembly BW, a coordinate detection assembly KO, a data display assembly DS, a plotter assembly PL and a hardcopy assembly HG. The interface IF 2 provides the electrical adaption between the data processing machine DVA and the previously mentioned assemblies. The design and the operation of the different assemblies is described later on.

Finally, the data processing machine DVA is connected to an output unit AE, which comprises with the shown and described embodiment an interface IF 3 and a printing form producting machine DM, which for intaglio printing may be an engraving machine. It is to be understood that another device or machine has to be connected to the interface IF 3, if the printing form is to be produced in another manner. The connection is achieved by groups of lines U 3 and S 3, comparable to the connection of the input unit EE and the treatment unit BE. After the description of the principal arrangement now the input unit EE shall be described in greater detail. With the embodiment shown in FIG. 2 there are three information input devices. For the input, especially for the input of half-tone information, there are provided in dependency on the type of the original a plane scanner 1 or a drum scanner 2. With the plane scanner 1 an original 4 is mounted on an original support 3. If the original is a transparency, it may be illuminated by a light source 5 which is mounted on that side of the original 4 which is opposed to a scanning head 6. If the original is a reflexion original (e.g. printed matter) it can be illuminated by a light source 7 which is arranged on the same side of the original as the scanning head 6. The scanning head is adapted to scan the original 4 with respect to its spectral composition (when colour separations are produced) as well as with respect to the grey value of the original point-by-point. The point-by-point scanning is possible, since the scanning head 6 is movable by two drives 8 and 9 in the direction of the arrows shown in FIG. 2. The drive 8 rotates a spindle for the up-and-down movement of the scanning head 6, which spindle passes with an unthreaded part through the vertical bore of a cross-member. The scanning head 6 is held against rotation. The drive 9 rotates a horizontally extending spindle which engages a threaded bore in the cross-member. When the drive 9 is excited the motor 8 as well as the scanning head 6 will be moved in horizontal direction. The point of the original which is to be scanned at times, can be freely selected in both the coordinate directions by corresponding control of the drives 8 and 9 via the control lines 11 and 12, respectively, by a drive control unit 13.

For the drum scanner 2 the same reference numbers have been used except the addition of a. With a drum scanner there is also possible a free selection of the rotational position of the points to be scanned; the rotational movement of the cylindrical original support 3a, however, offers in this case the use of a line-type sequence of the points to be scanned, whereas with a plane scanner any sequence of scanned points is generally possible.

With both the scanners not only the distance of individual points and lines from each other, respectively, may be freely selected during the scanning of the original, but also the distance of the individual points within each line can be freely selected independently from each other. Therefrom results the distinct advantage that the amount of the information to the stored can be adapted from the start to the resolution of the later print and to the geometric positions of the raster points of the individual printing inks in an optimal manner.

Figure 2:
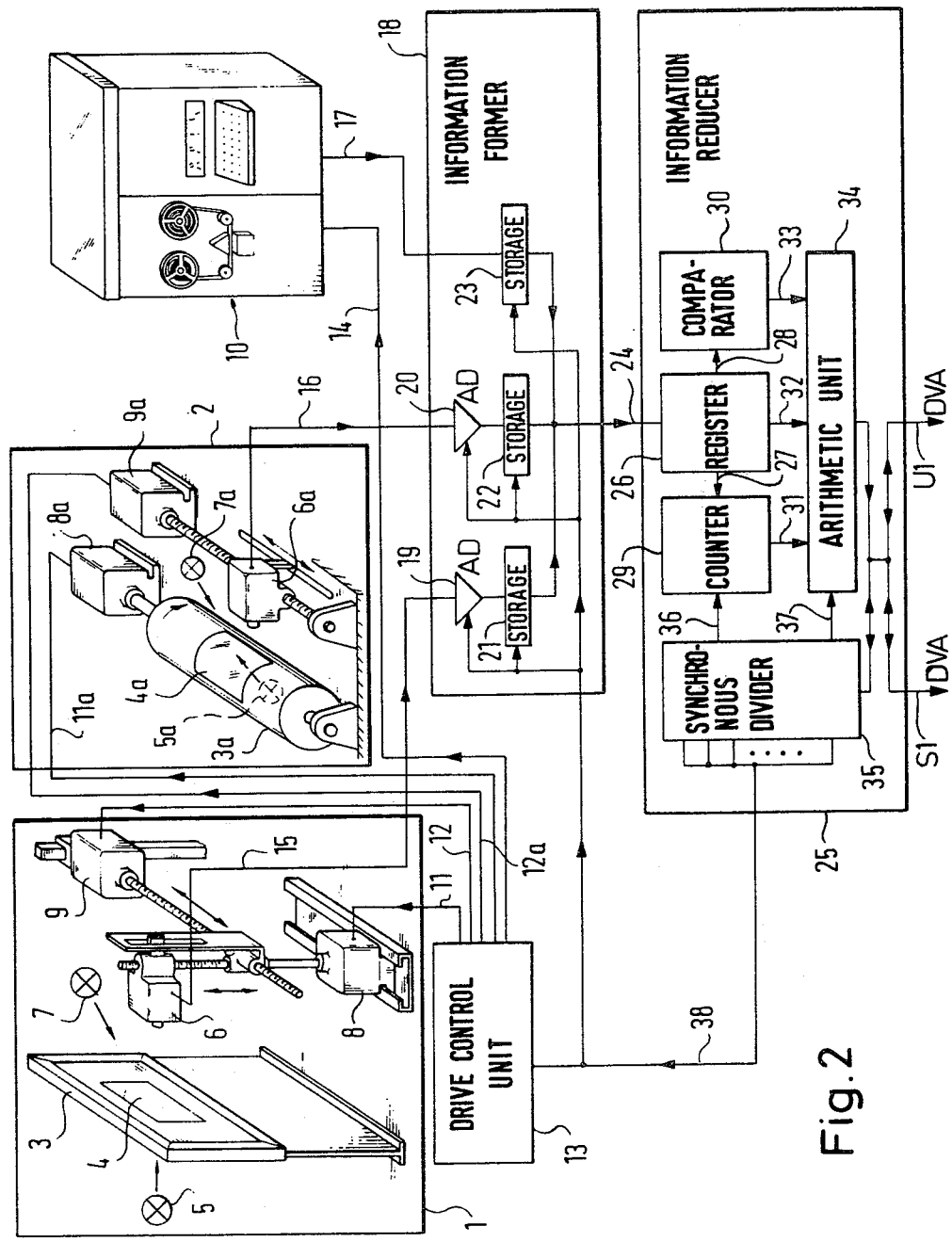
FIG. 2 is a detailed illustration of the input unit according to FIG. 1.

As a further information input device there is provided an electronic composition processing machine 10, which is connected to the drive control unit 13 via a group of lines 14. As it is schematically shown in FIG. 2, the character input into the electronic composition processing machine 10 can be achieved, for example, by a tape reader or a key-board.

The electrical data provided by means of the plane scanner 1, the drum scanner 2 and the electronic composition processing machine 10 are fed via groups 15, 16 and 17 of lines, respectively, to an information former 18. The information former 18 has the task to convert the analog data supplied by the plane scanner 1 and the drum scanner 2 into digital data and to get the thus formed digital data to a uniform format. To achieve this the groups of lines 15 and 16 are first of all led to analog/digital converters 19 and 20, respectively. The outputs of these analog/digital converters are connected to storages 21 and 22, respectively; the group of lines 17 is directly connected to a storage 23. When the amplitude of the analog data corresponding to the individual image point is digitalized, the number of the distinguishable steps is freely selectable, so that this number can be adapted to the number of tonal values which are distinguishable in the print.

The following advantage results from the above: The information contents of the original to be scanned is already reduced during the scanning to the information contents which may be reproduced by the print. Thus, the storage capacity necessary on the data processing side and the arithmetic expanditure necessary are not only delimited to a minimum, byt may be adapted in a very simple manner to the desired quality of print. The freely selectable local position of the points - also with respect to individual colour separations the associated printing areas of which have to be differently arranged on the printing form in dependency of the colour with the respective printing processes due to moire formation (e.g. with intaglio printing) - allows that the point position on the individual colour separations may already be selected during the scanning of the original in such a manner that between image point in the original and image point of the printing form the local position may be adapted in such a manner as it is optimal for the desired angular position of the raster.

The information former 18 is connected via a group of lines 24 to an information compressor or reducer 25. The information reducer has the task to reduce the redundancy of the information with respect to the organization of the data processing machine DVA as well as with respect to the information contents of the individual data. The group of lines 24 is connected to a register 26 which in turn is connected by groups of lines 27 and 28 to a counter 29 and a comparator 30, respectively. By means of groups of lines 31, 32 and 33 the counter 29, the register 26 and the comparator 30, respectively, are connected to an arithmetic unit 34. Further, the information reducer 25 includes a synchronous divider 35 for the timing of all the devices belonging to the input unit EE. The synchronous divider 35 provides from a master clock signal clock signals of eventually different frequencies in synchronized phase relations for the control of the input devices. Therefore, the synchronous divider 35 is connected via a group 36 of lines to the counter 29, a group 37 of lines to the arithmetic unit 34 and via a group 38 of lines to the drive control unit 13.

The synchronous divider 35 does not only provide the clock signals necessary for the data transfer within the information former 18 and the information reducer 25, but also the control clock signals which are converted by the drive control unit 13 in control commands for the drives 8 and 9 of the plane scanner, the drives 8a and 9a of the drum scanner 2 and for the composition processing machine 10. A branch of the group 38 of lines is therefore connected to the analog/digital converters 19 and 20 and to the storages 21 to 23; the outputs of the storages 21 to 23 are combined to said group 24 of lines.

The drive control unit 13 converts the clock signals of the synchronous divider 35, for example, into such control commands which are necessary for the predetermined raster angle between the memory raster for the individual characters stored in the composition processing machine 10 and the reproduction raster.

The synchronous divider 35 is connected via the groups of lines U1 and S1 with the data processing machine so that the synchronous divider may send interrupt pulses to the data processing machine and the peripheral equipment thereof, respectively, as outlined later on in detail, and may receive feed-backs from the data processing machine and the peripheral equipment, respectively. The information from the output of the arithmetic unit 34 is also transferred via the groups of lines U1 and S1 to the data processing machine and the peripheral equipment, respectively.

To reduce the redundancy of the information, the information reducer 25 operates as follows:

The data arriving via said group of lines 24 are accepted by the register 26 one after the other, while the counter 29 detects the number of the data and the comparator 30 the value of the data. The counter 29 and the comparator 30 derive command signals therefrom, which reach the arithmetic unit 34 together with the data from the register 26. In the arithmetic unit 34 the reduction of the redundancy is performed based on the command signals. The reduced data are transferred to the electronic data processing machine DVA via the groups of lines U1 and S1, respectively.

Figure 3:
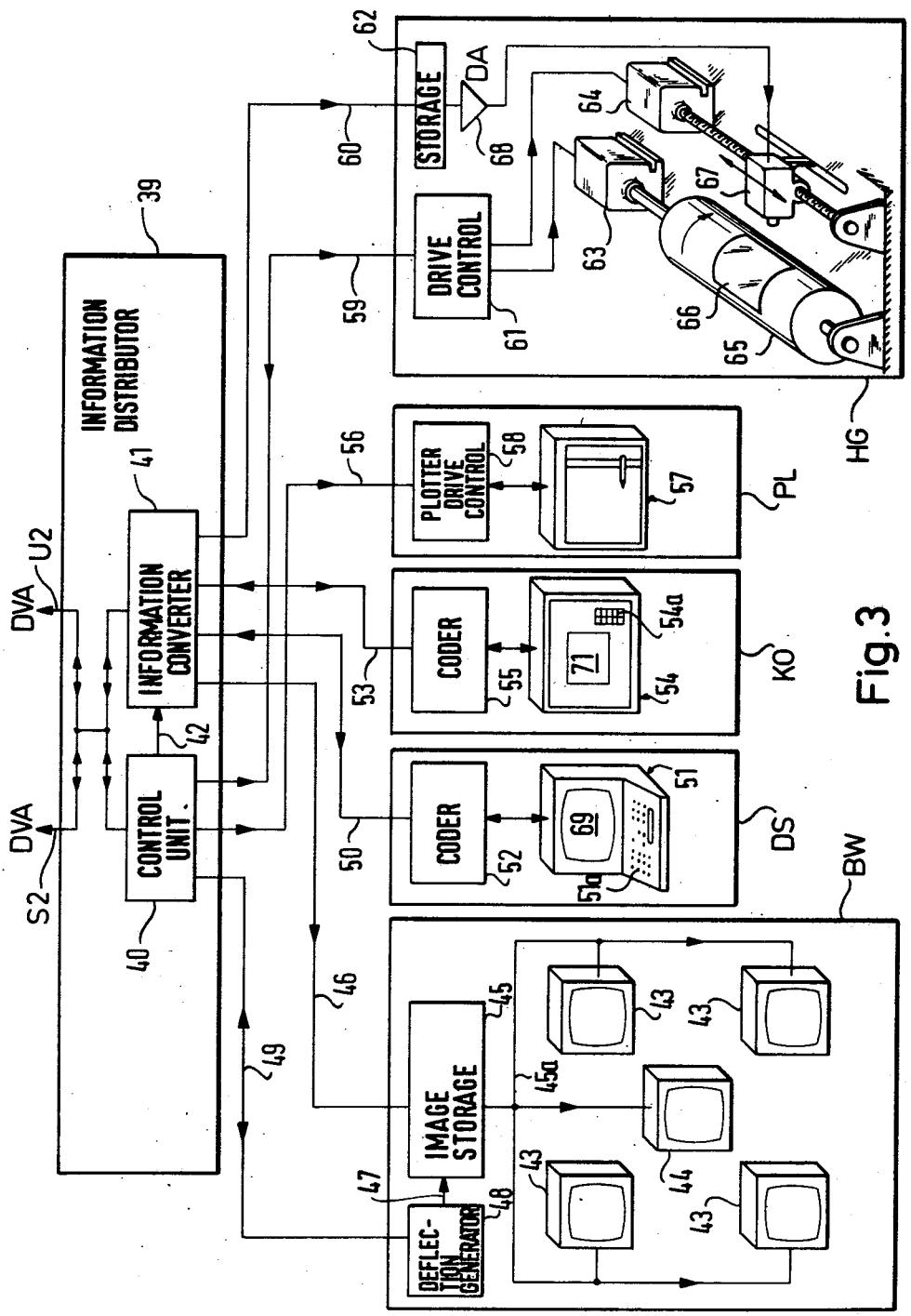
FIG. 3 is a detailed illustration of the treatment unit according to FIG. 1.

With respect to FIG. 3 now the treatment unit BE is described. The treatment unit BE includes an information distributor 39, which is connected to the data processing machine DVA via the groups of lines S2 and U2. The groups of lines S2 and U2 are connected to a control unit 40 and an information converter 41. The information converter is controlled by said control unit 40 via a group of lines 42. Further, the treatment unit BE includes an image display assembly BW. The shown embodiment of the image display assembly BW includes four black-and-white monitors 43 for four separations and a colour monitor 44. The inputs of said monitors are connected via a group of lines 45a to the input of an image storage 45. The information input of the image storage 45 is connected via a group of lines 46 to an output of the image converter 41 associated to the image storage. Via a group of lines 47 a control input of the image storage 45 is connected to a control output of a deflection generator 48, which is in turn connected to the control unit 40 via a group of lines 49.

The image display assembly BW allows the display of the information stored in the data processing machine in its original form as well as eventually in the treated form thereof, to allow an operator to judge the stored information. As the embodiment teaches, it is not only possible to judge a coloured image on the colour monitor 44, but the individual colour separations of an original may also be judged and valued by means of the black-and-white monitors 43. Before the mode of operation of the image display assembly BW is described, the mode of operation of the information distributor 39 shall be described, which also refers to the cooperation of the information distributor 39 with the other assemblies of the treatment unit BE.

All the signals arriving from the data processing machine and going to the data processing machine pass the information distributor 39. The information converter 41 of the information distributor 39 converts the organization structure of the data in such a manner that the data arriving from the data processing machine via the groups of lines U2 or S2 are adapted to the requirements of the individual assemblies and that the data produced by some of the assemblies are converted in such a manner that the data may be passed on to the data processing machine. The control unit 40 controls the order of commands between the data processing machine and the devices of the treatment unit BE.

Now the mode of operation of the image display assembly BW is described as follows:

For the display of the originals by means of the image display assembly BW it is necessary that the information transferred from the data processing machine DVA via the information converter 41 and the group of lines 46 is buffered in the image storage 45. The image storage 45 provides for an adaption in time between the data processing machine DVA and the colour monitor 44 and the black-and-white monitors 43, respectively, and provides for the renewing of the image information on the monitors without the necessity to continuously recall the data for the displayed information again and again from the data processing machine. The deflection generator synchronizes the data processing machine, the image storage and the monitors with each other.

The information converter 41 is connected to the data display assembly DS via a group of lines 50, which assembly comprises a data display device 51 with an input key-board 51a and a coder 52.

Further, the information coverter 41 is connected by a group of lines 53 to the coordinate detection assembly KO, which comprises a coordinate detection device 54 and a coder 55. Within both assemblies the coders 52 and 55 are provided to adapt the information coming from the data processing machine and going to the data processing machine by coding and decoding, respectively.

Several coordinate detection devices are commerically available for the purposes of the present invention, so that no special embodiment has to be described here. The coordinate detection device 54 provides the address access to each individual image point or to groups of image points which can then be separately treated with respect to value and/or position by a normal data processing command, which treatment corresponds to retouching and/or mounting. The data processing commands can, for example, be put in to the system for example by a key-board 51a of the data display assembly DS or by a command input board 54a of the coordinate detection device 54. Further, image or composition portions of different originals, which portions are addressed by corresponding data processing commands, can be composed to a new unity, which treatment would correspond to the manual mounting used up to now.

The control unit is connected via a group of lines 56 to the plotter assembly PL, which comprises a plotter 57 and a plotter drive control 58. The task of the plotter 57 is further discussed in the description of a practical embodiment of the treatment unit BE later on.

Further, the hard-copy assembly HG is connected via group of lines 59 to the control unit 40 and via a group of lines 60 to the information converter 41, the group 59 leading to a drive control 51 and the group 60 leading to a storage 62. Two outputs of the drive control 61 are connected to two drives 63 and 64, respectively, the first of which rotates a mounting drum 65 for a hard-copy film and the second one of which axially moves an output head 67. The output of the storage 62 is connected to the input of a digital/analog converter 68, the output of which is in turn connected to the output head 67.

The information output to the hard-copy takes place point-by-point via the group of lines 60 to the storage 62, the main purpose of which is to act as a buffer. Synchronously therewith command signals from the control unit 40 are applied via the group of lines 59 to the drive control 61, which controls the drives 63 and 64 in such a manner that the point corresponding to the information is reached on the hard-copy foil 66 mounted on the mounting drum 65. The rotation of the mounting drum 65 and the movement of the output head 67 are indicated in FIG. 3 by corresponding arrows.

Figure 4:
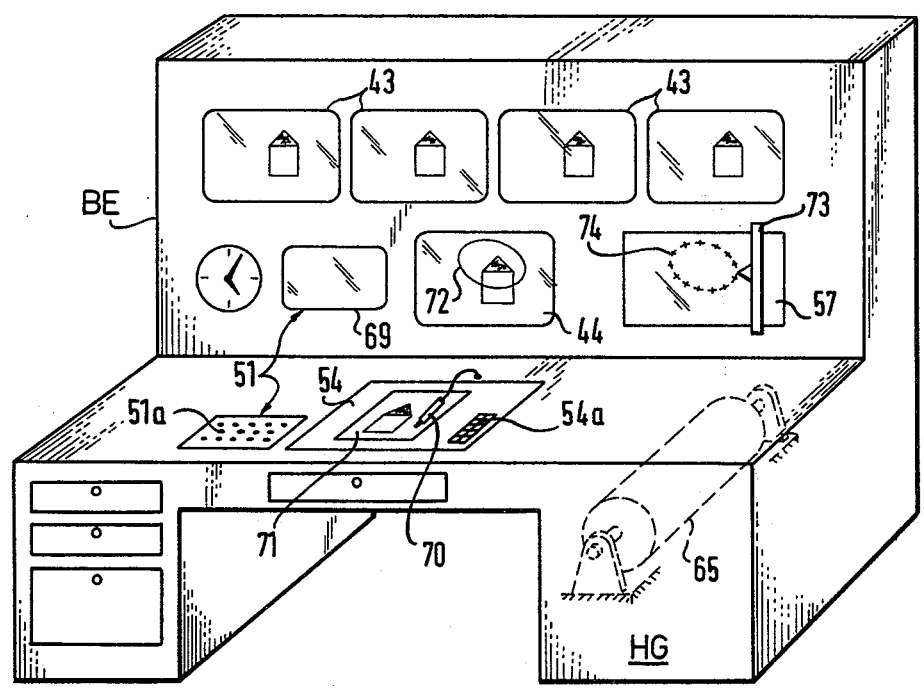
FIG. 4 is a possible practical embodiment of the treatment unit.

FIG. 4 shows a treatment unit BE in the form of an operator's desk. In this desk the individual assemblies have a special attachment in space with respect to each other. The input key-board 51a of the data display device 51 and the command input board 54a of the coordinate detection device 54 are arranged within reach of the operator. In an optimum visual height and visual distance one colour monitor 44 and four black-and-white monitors 43 are provided. The subject displayed on each monitor in FIG. 4 is a house. With the embodiment shown in FIG. 4 the data display device 51 with its screen 69 and its input key-board 51a is implemented separately from the coordinate detection device 54 with a contour-follow-up-pen 70 and the command input key-board 54a. As it is shown in FIG. 4, a reflexion or transparent original 71 can be mounted on the input table of the coordinate detection device 54. There are, however, embodiments possible with which the operation of coordinate detection is achieved by the well-known light pen systems. In this case the special assembly KO could be deleted and the contour-follow-up-pen 70 could then be designed as a light pen, with which the coordinates to be detected could be addressed on the screen 69 or on the screens of the monitors 43 and 44, respectively. With the above coordinate detection systems the addressed access to each individual image point as well as to groups of image points is possible.

On the image screen of the colour monitor 44 the contour of an addressed image area is shown by a line 72 so that the operator can precisely check in which image areas he performs a treatment of the information contents thereof. Such contours may also be displayed on the monitors 43 and on the screen 69 of the data display device 51. To allow reconstruction of all performed treatment operations upon later on inquiries, the plotter 57 is provided. The plotter drive control 58 converts the commands arriving from the control unit 40 into displacements of the plotter recording element 73 in X-, Y-Z-directions. The line 74 plotted by the plotter 57 corresponds to the line 72 on the screen 44 and eventually on the screens 43 and 69. By using different plotting symbols, the type of the reproduction technique can be recorded. When, for example, within the area defined by the line 72 an increase of the signal amplitude takes place, the line 74 can be plotted by using small crosses.

The operator's desk also includes a hard-copy assembly HG with which the image information can be recorded in black-and-white, for example with colour separations, depending on the type of device used or in the form of a colour control picture. In FIG. 4 only the mounting drum 65 is sketched.

By means of the different assemblies of the treatment unit BE not only the manual retouching and mounting operations of today can be performed, but now retouching and mounting operations may be performed which are only achievable by the mathematical potential of an electronic data processing machine.

If the information for all the pages belonging to a printing form have been stored and eventually treated, the information can be re-sorted by a simple sort command with respect to position as it is required by the imposing scheme of the printing form. With the embodiment shown in FIG. 5 referring to the production of an intaglio printing form (rotogravure) the information of a printing form which has been treated according to the imposing scheme after performing the sort command, can be transferred together with the associated control commands via the group of lines U3 or S3 to an information expander 75 and a synchronous divider 76 in the output unit AE. The information expander 75 corresponds in its design to the information reducer 25, so that in FIG. 5 only the individual blocks have references, while the group of lines connecting the blocks have not been referenced. The register 77 accepts serially the data arriving via the group of lines U3 and S3, respectively, while the counter 78 detects the number of the data and the comparator 79 detects the value of the data.

The counter 78 and the comparator 79 derive control commands therefrom and the control commands are transferred together with the data from the register 77 to the arithmetic unit 80, in which the expansion of the data is performed on the basis of said control commands. The expansion corresponds to the reversal of the data reduction performed in the information reducer 25 (compare FIG. 2) due to the redundancy at hand in the incoming data. The output of the arithmetic unit 80 is connected via a group of lines 81 to the information former 82. All the commands reaching the output unit AE from the data processing machine are fed into the synchronous divider 76, which does not only provide the control within the information expander 75, but also provides the control for the information former 82 and the drives 83 and 84 of the printing form production machine DM. To achieve this the information former 82 and the printing form production machine DM are connected by a group of lines 85 to the synchronous divider.

In the shown and described embodiment for rotogravure the drive 83 serves the rotation of a printing form cylinder 86, the surface of which is to be engraved, while the drive 84 serves the shifting of one or more engraving heads 87. The output of the information former 82 is connected via a group of lines 88 to the inputs of the engraving heads 87.

The information former 82 comprises a storage 89, the input of which is connected to the group of lines 81 and a series-to-parallel converter 90 connected to the output of the storage 89 and of a digital/analog converter 91 in parallel to the series-to-parallel converter 90. The storage 89 and the series-to-parallel converter 90 are timed by the synchronous divider 76.

The control is performed in such a manner that not only a synchronous operation of the data processing machine DVA and the printing form production machine DM is achieved, but also the necessary angular position of the raster of the printing form is achieved which is usual and necessary with rastered printing forms to avoid moire formation with the individual colours.

The data processed in the arithmetic unit 80 are fed via the group of lines 81 into the storage 89. For the control of a rotogravure engraving machine it is necessary that the data are simultaneously at hand in analog form for a plurality of engraving tracks. This data conversion is achieved by the series-to-parallel converter 90 and the digital/analog converter 91, respectively.

Figure 5:
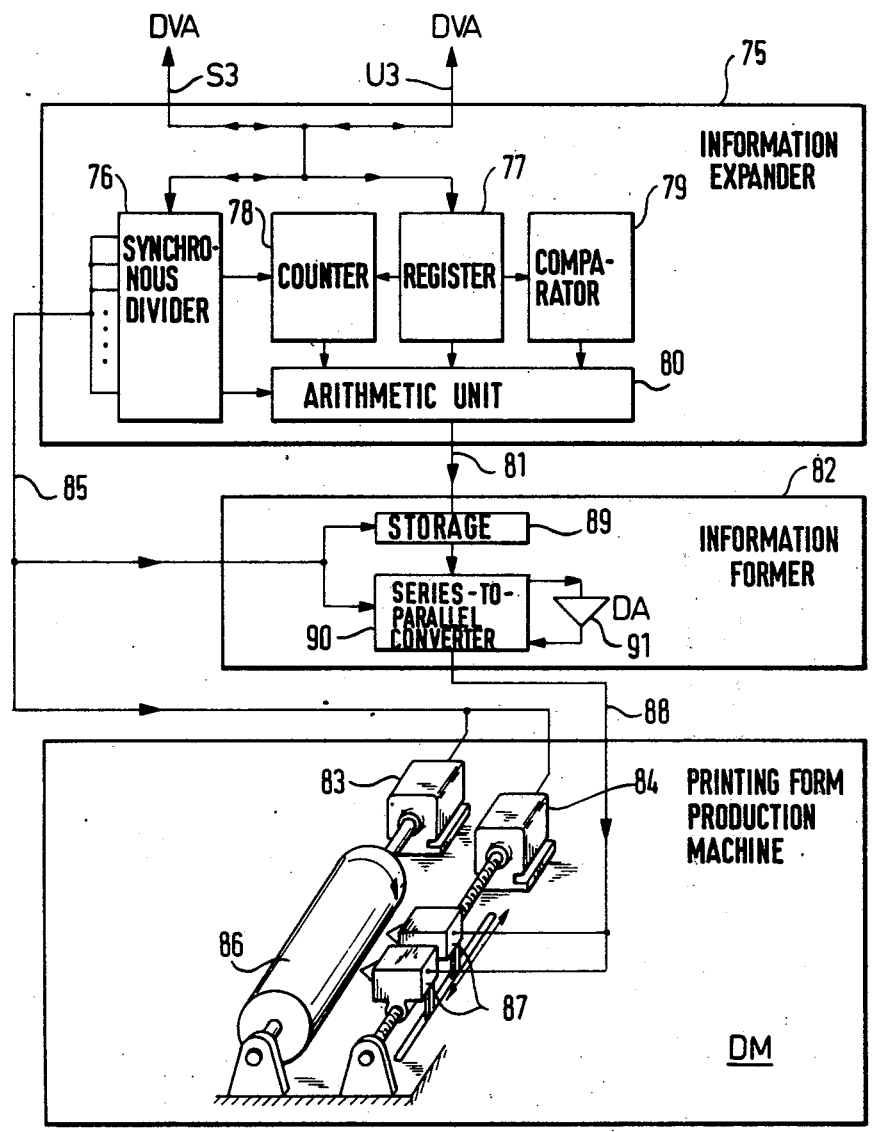
FIG. 5 is a detailed illustration of the output unit according to FIG. 1.

All three interfaces IF1, IF2 and IF3 according to FIG. 1 which have been described in FIGS. 2, 3 and 5 in detail, have the common characteristic that they are able to perform the individual steps of operation in ON-LINE operation with the central data processing machine via the groups of lines U1 to U3, as well as are able to perform direct data transfer with the individual peripheral devices (e.g. tape machines or disc memories) via the groups of lines S1 to S3 while bypassing the central processing unit, so that the individual steps of the process schedule can be performed independently from each other even then, when there are failures in parts of the system. These modes of operation are schematically shown in FIGS. 2, 3 and 5 by the joining and splitting of the groups of lines S and U within the units EE, BE and AE.

With respect to FIGS. 1, 2, 3 and 5 it has to be marked that the simple arrow and the double arrows on the group of lines shall characterize the directions of the signal flows on the group of lines. It should be understood that the connections built up by the group of lines and the arrows on the group of lines as shown in the figures are important for the understanding of the present invention.

For one skilled in the art it should be clear that the number of conductors in each group of lines may be different from group to group.

The following table gives examples for commerically available devices and machines, which may be used in the system:

| Device Assembly | Type |
| --- | --- |
| plane scanner | "Varioklischograph" of Hell GmbH, Kiel |
| drum scanner | Magnascan 450 of Crosfield |
| electronic composition processing machine | "Digiset" of Hell GmbH |
| data display device | Digital Equipment Corp., VT 05 |
| coordinate detection device | "Aristogrid" of Aristo-Werke, Hamburg |
| plotter | 7004 B of Hewlett-Packard |
| light pen device | Light Pen 4551 of Tektronix |
| hard-copy device | Output Side of Diascan 3000 of Crosfield |
| printing form production | Engraving Machine K 193 of |

| Device Assembly | Type |
| --- | --- |
| machine | Hell GmbH |

What we claim is:

1. A control method for the production of a printing form for printing the image of an original, comprising the steps of selecting the sequence of the points to be scanned on the original, which sequence is freely selectable in both coordinate directions of the original; scanning the original by scanning means producing electrical image signals and digitalizing said image signals; storing the information of the original in form of said image signals in the storage locations of a memory; displaying the stored information for a selected variation of at least part thereof; determining the addresses of those storage locations, which are intended to be varied in their information contents by detecting the coordinates of the part-information to be varied; processing the contents of the addressed storage locations in a computer, which is supplied with control commands necessary for the intended variation of the information contents; and editing the processed information in a form suitable for the control of the production of the printing form.

2. The method as defined in claim 1, wherein the scanning of the original points is performed in any sequence.

3. The method as defined in claim 1, wherein the scanning of the image points is performed line by line and wherein the point spacing within one line and/or the line spacing are selected independently on each other.

4. The method as defined in claim 1, wherein besides the information gained by scanning of said original, electronically composed information is also stored.

5. The method as defined in claim 1, including the step that before the storing of the image signals the redundancy of the information to be stored is reduced.

6. The method as defined in claim 1, wherein during the display of the stored information the contours of the addressed part-information is displayed.

7. The method as defined in claim 6, including the step of recording said contours on a recording medium.

8. The method as defined in claim 1, wherein the varied image information is recorded on a recording medium.

9. The system as defined in claim 1, wherein each of said units includes an interface for the reception and the transfer, respectively, of signals to the data processing machine.

10. The system as defined in claim 9, wherein said interfaces cooperate with said data processing machine in ON-LINE or OFF-LINE modes of operation.

11. The system as defined in claim 9, wherein said interfaces directly cooperate with the peripheral devices of a data processing machine while the central unit of the data processing machine is bypassed.

12. A control for the production of a multi-page printing form for printing the images of originals, comprising the steps of first selecting the sequence of the points to be scanned on each original, which sequence is freely selected in both the coordinate directions of said original; scanning said original by scanning means producing electrical image signals and digitalizing said image signals; storing the information of each page in form of electrical signals in the storage locations of a memory; displaying the stored information for a selected variation of at least part thereof; determining the addresses of the storage locations, which are intended to be varied in their information contents; detecting the coordinates of the part-information to be varied and processing the contents of the addressed storage locations in a computer, which is supplied with control commands necessary for the intended variation of the information contents; re-sorting the information corresponding to the individual pages belonging to said printing form within said memory in such a manner that the position of the information data within the memory corresponds to the position of the pages on the printing form to be produced; and editing the processed and re-sorted information in a form suitable for the control of the production of said printing form.

13. The method as defined in claim 12, wherein the processed and re-sorted stored information data are directly used for the control of a printing form production machine.

14. The method as defined in claim 12, wherein besides the information gained by scanning an original, also electronically composed information is stored.

15. A system for information processing for the production of a printing form for the printing of an original, comprising an input unit including at least a scanner for scanning an original with a driven scanning head producing electrical image signals, control means for the drive means of said scanning head, which control means allows the free selection of the scanning point sequence of the scanning head, information forming means for digitalizing said image signals; a data processing machine connected to said input unit and including memory means and a central processing unit; a treatment unit connected to said memory means and said central processing unit, which treatment unit in turn includes at least an assembly for displaying the stored information, as assembly for detecting the coordinates of portions of the displayed information and an assembly for the manual input of data processing commands; and an output unit connected to said data processing machine and including a printing form production machine.

16. The system as defined in claim 15, wherein the input unit also includes an electronical composition processing machine.

17. The system as defined in claim 15, wherein information reducing means is connected to said information forming means, which information reducing means comprises a register taking the output data of said information forming means, a counter detecting the number of said data and a comparator detecting the value of said data, and arithmetic unit controlled by the control signals of said counter and said comparator and connected to the output of said register and clock means, which clock means produces clock signals for the control of the input devices of said input unit, said information forming means and the other components of said information reducing means.

18. The system as defined in claim 17, wherein the clock means comprises a synchronous divider connected to said data processing machine.

19. The system as defined in claim 17, wherein the output unit includes information expansion means, which corresponds in its construction to the information reducing means of said input unit, and information forming means.

20. The system as defined in claim 19, wherein for the simultaneous forming of a plurality of printing form tracks on the printing form production machine information forming means are connected to the output of said information expansion means, which information expansion means comprises a storage, a series-to-parallel converter and a digital/analog converter.

21. The system as defined in claim 15, wherein the treatment unit includes for the display of the stored information an image display assembly with at least one monitor.

22. The system as defined in claim 21, wherein the image display assembly includes besides said monitor also an image display assembly includes besides said monitor also an image storage and a deflection generator which synchronizes the data processing machine, the image storage and the monitor with each other.

23. The system as defined in claim 22, wherein at least one colour monitor and one black-and-white monitor are provided.

24. The system as defined in claim 15, wherein the input of data processing commands is possible by means of the keyboard of a data display device of a data display assembly.

25. The system as defined in claim 24, wherein said data display assembly and said coordinate detection assembly each comprises a corresponding device and a coder connected to the input of said device.

26. The system as defined in claim 15, wherein the input of data processing commands is possible by means of the command input board of a coordinate detection device of said coordinate detection assembly.

27. The system as defined in claim 15, wherein the treatment unit includes a plotter assembly including a plotter for the recording of the contours of image areas varied in the information contents thereof and of characters and symbols indicating the type of information variation within said contours.

28. The system as defined in claim 15, wherein said treatment unit includes a hard-copy assembly for the recording of the stored information.

29. The system as defined in claim 15, wherein said assemblies are connected to the data processing machine via an information distributor.

30. The system as defined in claim 15, wherein the printing form production machine is an engraving machine.

* * * * *

UNITED STATES PATENT OFFICE
CERTIFICATE OF CORRECTION

Patent No. 4,007,362      Dated February 8, 1977

Inventor(s) Wolfgang Sindermann

It is certified that error appears in the above-identified patent and that said Letters Patent are hereby corrected as shown below:

Column 12, line 51, cancel "1" and substitute - 15 -.

Column 12, line 62, after "control" insert - method -.

Column 13, line 40, cancel "as" and substitute - an -.

Signed and Sealed this

Nineteenth Day of April 1977

[SEAL]

Attest:

RUTH C. MASON
*Attesting Officer*

C. MARSHALL DANN
*Commissioner of Patents and Trademarks*